W. H. MANSELL.
LOCK NUT.
APPLICATION FILED DEC. 30, 1919.

1,364,397.

Patented Jan. 4, 1921.

Inventor
William Henry Mansell
By Wm Wallace White
ATTY.

UNITED STATES PATENT OFFICE.

WALTER HENRY MANSELL, OF GRAYS, ENGLAND.

LOCK-NUT.

1,364,397.  Specification of Letters Patent.  Patented Jan. 4, 1921.

Application filed December 30, 1919. Serial No. 348,391.

*To all whom it may concern:*

Be it known that I, WALTER HENRY MANSELL, a subject of the King of Great Britain, residing at "Lyncroft," New Road, Grays, in the county of Essex, England, have invented a new and useful Improvement in Lock-Nuts, of which the following is a specification.

My invention relates to a lock-nut which does not require the use of a second nut to lock it when screwed up, and the objects of my improvement are, first to make the nut automatically lock itself to the bolt and secondly to enable the nut to be easily unlocked and removed from the bolt without damage to the nut or to the bolt.

I attain these objects by the mechanism illustrated by the accompanying drawings, in which:—

The same letters denote the same parts throughout the several views.

Figure 3:
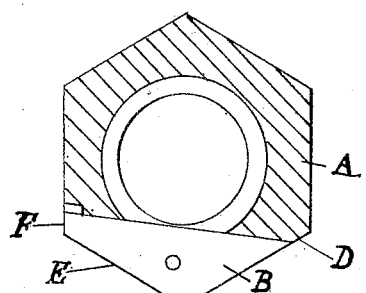
Fig. 3 represents a similar section of the nut with the locking device removed.

A is an ordinary hexagon nut in which is formed by milling or otherwise a groove B, the said groove being cut through the angle C and the sides D, E, F, as shown by Fig. 3, into the threaded portion of the nut.

Figure 5:
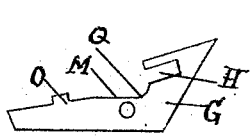
Fig. 5 represents a plan of the member which carries the locking roller.
Figure 4:
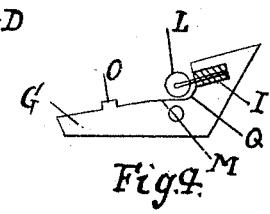
Fig. 4 represents a plan of the locking device detached from the nut.
Figure 6:
Fig. 6 represents an elevation of the same.
Figure 8:
Fig. 8 represents an elevation of the same.
Figure 7:
Fig. 7 represents a plan of the locking roller and spring.
Figure 9:
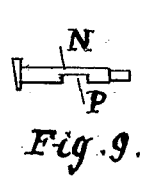
Fig. 9 shows the unlocking plunger.

Fitting the groove B is a separate member or lock plate G, which may be made of steel, or of any other suitable metal, and which is shown in detail by Figs. 4, 5, and 6; the outside of the member G being flush with the sides D, E, F, of the nut A.

A groove or slot H is formed in the member G in which is located a spring I which embraces the fork K which carries the locking roller L.

The locking roller L is of any required shape to fit the threads of the bolt, the roller being shown conical in cross section to fit a V threaded bolt; the said roller being made of hard steel, or of any other suitable metal, and milled or knurled in order to obtain a good grip on the threads of the bolt when the nut is screwed up.

The inner edge of the member G forms an inclined plane M on which the roller L runs, the said inclined plane merging into a recess Q to receive the roller L when the nut is unscrewed.

Figure 1:
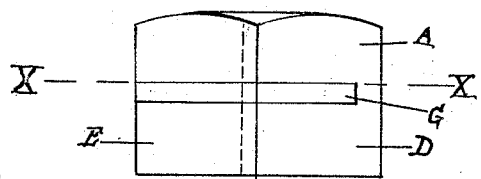
Figure 1 represents an elevation of a lock-nut constructed according to this invention.
Figure 2:
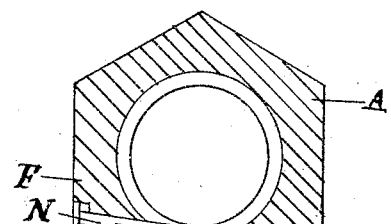
Fig. 2 represents a cross-section of the same on line X, X, Fig. 1.

The pressure of the spring I normally holds the roller L in the position shown by Figs. 2 and 4.

N is a pin or plunger which is inserted between the member G and the solid portion of the side F of the nut A, said pin or plunger being prevented from becoming detached from the nut by the lug O on the member G which lug engages with the slot P in the pin or plunger N.

The plunger N is pressed inward when it is required to unscrew the nut A and forces the roller L into the recess Q and releases the said roller from the threads of the bolt.

The plunger may be so constructed that the spanner used to unscrew the nut will force the plunger inward and release the roller L.

The member G is held in position by the pin R which passes through the lower portion of the nut, the member G, and partly through the upper portion of the nut A.

In some cases, when applying my invention to small nuts for example, I may omit the pin or plunger N and leave a space between the inner edge of the member G and the solid portion of the nut, the nut may then be unlocked by inserting a piece of stout wire in the said space and forcing the roller L into the recess Q.

The action is as follows:—

When the nut is revolved clockwise in order to screw it up the locking roller L is moved down the inclined plane M into the recess Q and away from the center of the nut, but as soon as the nut rotates, or tends to rotate, anti-clockwise the roller L which is now gripping the threads of the bolt under the action of the spring I is moved up the said inclined plane and is jammed between the inclined plane and the threads of the bolt and prevents rotation of the nut.

When the nut has to be removed from the bolt, as previously stated, the roller L is forced to the right by means of the plunger N, or by means of a piece of stout wire if no plunger is used, into the recess Q until it ceases to grip the bolt, the nut will then unscrew easily the same as an ordinary nut.

I claim:—

1. The combination in a lock-nut, of a nut having a groove therein, a lock plate secured in said groove, the inner edge of the said lock plate forming an inclined plane merging into a curved recess, a fork supported in a slot in said lock plate, a locking roller carried by said fork and adapted to move on said inclined plane into the plane of the threads of the nut, and a spring surrounding said fork.

2. The combination in a lock-nut, of a nut having a groove therein, a lock plate secured in said groove, the inner edge of the said lock plate forming an inclined plane merging into a curved recess, a fork supported in a slot in said lock plate, a locking roller carried by said fork and adapted to move on said inclined plane into the plane of the threads of the nut, a spring surrounding said fork, and means for forcing the locking roller out of the plane of the threads of the nut.

3. The combination in a lock-nut of a nut having a groove therein, a lock plate fitting into said groove, the inside edge of the said plate forming an inclined plane merging into a curved recess, a locking roller and spring carried by an inclined groove or slot in said plate, a plunger located between the said plate and the solid portion of the nut, and means for securing the said plate in the nut, all substantially as specified.

WALTER HENRY MANSELL.